United States Patent
Gnanaprakasam et al.

(10) Patent No.: US 12,231,431 B2
(45) Date of Patent: Feb. 18, 2025

(54) INTERNET PROTOCOL (IP) WHITELISTING FOR SIGNED UNIFORM RESOURCE LOCATORS (URLS)

(71) Applicant: Capital One Services, LLC, McLean, VA (US)

(72) Inventors: Hari Hara Sudhan Gnanaprakasam, Glen Allen, VA (US); Kimberly Russo, Riverton, UT (US); Sharath Kumar Sheshadri, Livermore, CA (US)

(73) Assignee: Capital One Services, LLC, McLean, VA (US)

( * ) Notice: Subject to any disclaimer, the term of this patent is extended or adjusted under 35 U.S.C. 154(b) by 189 days.

(21) Appl. No.: 17/837,764

(22) Filed: Jun. 10, 2022

(65) Prior Publication Data

US 2023/0403279 A1    Dec. 14, 2023

(51) Int. Cl.
*H04L 9/40*    (2022.01)
*H04L 45/02*   (2022.01)

(52) U.S. Cl.
CPC .......... *H04L 63/101* (2013.01); *H04L 45/04* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 9,306,908 B2 | 4/2016 | Yoo | |
| 10,326,710 B1 * | 6/2019 | Hashmi | G06F 9/45558 |
| 10,860,382 B1 * | 12/2020 | Sharifi Mehr | G06F 9/5038 |
| 10,970,303 B1 | 4/2021 | Denton et al. | |
| 11,216,581 B1 | 1/2022 | Arikapudi et al. | |
| 11,246,013 B2 | 2/2022 | Cooke et al. | |
| 2002/0083178 A1 * | 6/2002 | Brothers | H04L 63/10 709/218 |
| 2012/0131591 A1 | 5/2012 | Moorthi et al. | |
| 2013/0117305 A1 | 5/2013 | Varakin et al. | |
| 2014/0006384 A1 | 1/2014 | Jerzak et al. | |

(Continued)

OTHER PUBLICATIONS

Aug. 16, 2021, VentureBeat, Lazzaro, "How to migrate to Snowflake without getting 'data drunk'," <<https://venturebeat.com/2021/08/16/how-to-migrate-to-snowflake-without-getting-data-drunk/>>, 8 pages.

(Continued)

*Primary Examiner* — Joshua Joo
(74) *Attorney, Agent, or Firm* — Banner & Witcoff, Ltd.

(57) ABSTRACT

Systems as described herein may implement IP address whitelisting for signed Uniform Resource Locators (URLs). A computing device may receive, from a first user device, a first request to access a resource. The computing device may determine a first identifier of the first user device. After an authentication of the first user device, the computing device may generate a pre-signed URL indicating a location of the resource. The computing device may generate a signed URL by prefixing the pre-signed URL with the first identifier of the first user device. The computing device may receive a second request to access the resource. Based on comparing a second identifier corresponding to the second request with the first identifier in the signed URL, the computing device may grant or deny the second request access to the resource.

20 Claims, 7 Drawing Sheets

(56) References Cited

U.S. PATENT DOCUMENTS

| | | | | |
|---|---|---|---|---|
| 2014/0089495 | A1 | 3/2014 | Akolkar et al. | |
| 2014/0108509 | A1* | 4/2014 | Almeida | H04L 67/01 |
| | | | | 709/203 |
| 2017/0195340 | A1* | 7/2017 | Wang | H04L 63/0846 |
| 2017/0279912 | A1 | 9/2017 | Zhang et al. | |
| 2018/0205742 | A1* | 7/2018 | Vinukonda | H04L 63/107 |
| 2018/0255032 | A1* | 9/2018 | Burch | H04W 12/033 |
| 2018/0288117 | A1 | 10/2018 | Mangalore et al. | |
| 2018/0332016 | A1* | 11/2018 | Pandey | H04L 63/0428 |
| 2020/0195671 | A1* | 6/2020 | Engan | H04L 63/1425 |
| 2020/0412768 | A1* | 12/2020 | Hegde | H04L 63/10 |
| 2021/0089560 | A1 | 3/2021 | Funke et al. | |
| 2021/0334283 | A1 | 10/2021 | Gladwin et al. | |
| 2022/0114217 | A1* | 4/2022 | Paulus | G06F 16/908 |
| 2022/0182827 | A1* | 6/2022 | Chennupati | H04L 63/0272 |
| 2023/0109926 | A1* | 4/2023 | Nair | H04L 63/20 |
| | | | | 726/25 |
| 2023/0111864 | A1* | 4/2023 | Thomas | H04L 63/20 |
| | | | | 726/1 |
| 2023/0198987 | A1* | 6/2023 | Wei | H04L 12/66 |
| | | | | 726/1 |
| 2023/0409636 | A1* | 12/2023 | Paulus | G06F 16/24568 |

OTHER PUBLICATIONS

Nadilytics—The Intelligence Platform on top of Snowflake. Retreived from https://www.nadilytics.com/, retrieved online May 14, 2021, at 4:25:15 pm.

Snowflake for Data Sharing, Snowflake Workloads, <https://www.snowflake.com/workloads/data-sharing/>>, date of publication unknown but, prior to Jul. 13, 2021, 3 pages, published Aug. 2020.

Data Governance is Worth the Time and Trouble, <<https://www.snowflake.com/trending/data-governance-framework>>, date of publication unknown but, prior to Jul. 13, 2021, 14 pages.

Data governance with Snowflake: 3 things you need to know, <<https://www.talend.com/resources/data-governance-snowflake-3-things-to-know/, date of publication unknown but, prior to Jul. 13, 2021, 11 pages.

GPDR: A quick way to reduce scope, <<https://www.talend.com/resources/anonymize-data/>>, date of publication unknown but, prior to Jul. 13, 2021, 6 pages.

Jun. 14, 2019, Mushtaq, Data preprocessing in detail, <<https://developer.ibm.com/technologies/data-science/articles/data-preprocessing-in-detail/>>, 9 pages.

Wikipedia, Data pre-processing, <<https://en.wikipedia.org/wiki/Data_pre-processing>>, date of publication but, prior to Jul. 13, 2021, 4 pages.

Snowflake Data Exchange, << https://resources.snowflake.com/solution-briefs/data-exchange-solution-brief>>, date of publication unknown but, prior to Jul. 13, 2021, 2 pages.

Zhao, et al., "SLA-based Profit Optimization Resource Scheduling for Big Data Analytics-as-a-Service Platforms in Cloud Computing Environments," IEEE Transactions on Cloud Computing, Dec. 27, 2018.

Van Brandenburg et al. "URI Signing for Content Delivery Network Interconnection (CDNI) draft-ietf-cdni-uri-signing-26; draft-ietf-cdni-uri-signing-26.txt", Uri Signing for Content Delivery Network Interconnection (CDNI) DRAFT-IETF-CDNI-URI-SIGNING-26; DRAFT-IETF-CDNI-URI-SIGNING-26.TXT; Internet-Draft: CDNI, Internet Engineering Task Force, IETF; Standard No. 26, Mar. 22, 2022, pp. 1-43, XP015151154, retrieved from the internet: URL: https://tools.ietf.org/html/draft-ietf-cdni-uri-signing-26.

Sep. 25, 2023—(WO) International Search Report and Written Opinion—PCT/US2023/024814.

Working with Secure Views, Snowflake Documention, <<https://docs.snowflake.com/en/user-guide/views-secure.html>>, date of publication unknown but, prior to Jul. 13, 2021, published Aug. 2020.

* cited by examiner

| Type | URLS to Access the Resource | IP Address |
|---|---|---|
| Pre-signed URL | https://presignedurldemo.us-east-1.quicksight.ws.com/dashboards/?sX-WS-Algorithm=WS4-HMAC-SHA256&X-WS-Credential=AKIAJJWZ7B6WCRGMKFGQ%2F20180210%2Fus-east-1%2Fs3%2Fws4_request&X-WS-Date=20220210T171315Z&X-WS-Expires=1800&X-WS-Signature=12b74b0788aa036bc7c3d03b3f20c61f1f91cc9ad8873e3314255dc479a253518X-WS-SignedHeaders=host | CIDR Range: 192.168.0.15/24 |
| Signed URL | https://presignedurldemo.us-east-1.quicksight.ws.com/embed/e5a1e64ed7ac41cb8e5e315878e504eb/dashboards/?X-WS-Algorithm=WS4-HMAC-SHA256&X-WS-Credential=AKIAJJWZ7B6WCRGMKFGQ%2F20180210%2Fus-east-1%2Fs3%2Fws4_request&X-WS-Date=20180210T171315Z&X-WS-Expires=1800&X-WS-Signature=12b74b0788aa036bc7c3d03b3f20c61f1f91cc9ad8873e3314255dc479a253518X-WS-SignedHeaders=host | IP Address: 192.168.0.20 |

FIG. 5

INTERNET PROTOCOL (IP) WHITELISTING FOR SIGNED UNIFORM RESOURCE LOCATORS (URLS)

FIELD OF USE

Aspects of the disclosure relate generally to data storage and retrieval. More specifically, aspects of the disclosure relate to a data processing and management process for implementing privacy and data restrictions on a cloud database platform that provides access to shared databases.

BACKGROUND

Cloud database platforms such as the Snowflake architecture, produced by Snowflake Inc. of San Mateo, CA, permit organizations to logically separate but natively integrate storage, computing, and services. Snowflake and similar "data warehouse as a service" platforms may provide users access to cloud database storage, whereby storage of data is maintained in separate servers. This process allows data creators to share their data with a wide variety of consumers. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. This process also allows users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

In addition to avoiding resource limitations associated with queries, another advantage of the Snowflake architecture is that it allows users to collect data in a way that is resilient. Because a user's laptop may be relatively underpowered, queries that request significant amounts of data may crash the laptop. Moreover, because a single device collects the results of a query, unexpected technical issues (e.g., power loss, Internet disconnects) may cause the entire query to fail. The Snowflake architecture is equipped with built-in replication and failover/failback procedures which avoid such crashes, thereby ensuring that data continuity may be preserved. That said, such robustness can come with a caveat: because the Snowflake architecture can handle larger and more robust queries, a user may submit a malformed or overly broad query and thereby inadvertently cause a virtual warehouse to spend considerable time and computing resources.

One way in which the Snowflake architecture improves conventional query execution is that Snowflake allows virtual warehouses to be created, modified, and destroyed as desired. This allows multiple queries to be executed simultaneously but separately. For example, the Snowflake architecture allows a first user from an organization to execute a first query in a first virtual warehouse at the same time that a second user from the same organization executes a second query in a second virtual warehouse. To preserve computing resources, the different virtual warehouses may be configured with different computing resources.

One useful feature in Snowflake is the ability to share data without needing to copy that data over from one storage device for another. This process might be referred to as a "zero copy" process, referring to the fact that the underlying data need not be copied for it to be shared. For example, an owner of data (which might also be referred to as a data producer and/or data creator) might sell access to all or portions of their data to one or more consumers, such that the one or more consumers might use virtual warehouses to access and execute queries against that data. In this manner, the consumers gain quick and easy access to the data, while the owner maintains control of the data. Advantageously, this means that needless copies of the data are not created, which means that updates to the data are available to all users.

A Business intelligence (BI) tool may interact with a virtual warehouse manager application, capture quantitative and qualitative data from the underlying warehouses and share a visualization that may display the underlying data source from Snowflake. For example, the BI tool may provide a cloud-scale business intelligence service and allow data scientists to connect their data, create analysis and visualization, and publish the result to an interactive dashboard to be viewed by the data scientists and other users in an organization or embed the dashboard into an application. The data scientists may apply data filters to interact with and visualize the captured data in the interactive dashboard, discover hidden insights from the captured data, and perform more accurate forecasting and analysis.

One concern with Snowflake's data sharing and the dashboard's data visualization functionality is that a conventional system may use a range of identifiers (e.g., Internet Protocol (IP) addresses) associated with different consumers of data to permit access to the shared data and resources via the dashboard. For example, an enterprise may use IP addresses in the form of a Classless Inter-Domain Routing (CIDR) range that might be rotated among different enterprise users. The IP addresses may be associated with user devices hosting applications requesting one or more resources. In response to a successful authentication, the enterprise may generate a pre-signed Universal Resource Locator (URL) to grant an authenticated user device access to a dashboard displaying the underlying resource in the data sharing platform. Note that the pre-signed URL may be tied to an IP range, such that unauthenticated user devices within the IP range may gain access to the dashboard using the pre-signed URL. As such, preservation of the privacy and security in the data sharing and data visualization process may be compromised.

Aspects described herein may address these and other problems, and generally improve the security, efficiency, and speed of processing secure data using IP whitelisting for signed URLs.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to using IP whitelisting for signed URLs. A pre-signed URL may provide a path to access a resource in a cloud database platform such as a Snowflake or other data sharing platform. The resource may be related to records of a database stored on a database server in the cloud database platform. For example, an enterprise might generate financial records data through its operations, then store that data in the Snowflake platform. Using the Snowflake platform and/or similar cloud database platforms, that enterprise might not only store their own data in the cloud (which has its own benefits, particularly with respect to the use of virtual warehouses), but may also readily share the data with others (e.g., consumers of that data, such as other organizations). The data might be provided through a data marketplace, whereby users might exchange (e.g., sell) access to their data stored in the cloud database platform. The pre-signed URL may be associated with an expiry time that may expire after a specific amount of time (e.g., 30 minutes) based on temporary credentials generated on behalf of a user device. For example, the pre-signed URL may indicate a location of the resource in the cloud database platform. The pre-signed URL may comprise an indication that the user device is permitted to access the resource. To address the security issue that unauthorized user devices may attempt to access the resource using the same pre-signed URL, the pre-signed URL may be pre-fixed with an identifier (e.g., an IP address) of the authorized user device to generate a signed URL. Rather than using IP addresses in the form of a CIDR range that might be shared among different enterprise users, only the authorized user device holding the original identifier may be permitted to access the resource via the signed URL. For example, the users may attempt to access the resource in Snowflake from a dashboard application that may provide a visualization to the underlying secured data. The IP whitelisting mechanism in the present disclosure may provide a layer of protection against the unwanted and/or unauthenticated users from accessing the dashboard and viewing the underlying secured data.

As one example of how aspects described herein may be implemented, a computing device may receive, from a first user device, a first request to access a resource. The computing device may determine a first identifier of the first user device based on the first request and in response to receiving the first request from the first user device. For example, the identifier may include an IP address, a network address or a name that may uniquely identify the first user device. After an authentication of the first user device, the computing device may generate a pre-signed Uniform Resource Locator (URL) indicating a location of the resource. The pre-signed URL may include an indication that the first user device is permitted to access the resource. The computing device may generate a signed URL by prefixing the pre-signed URL with the first identifier of the first user device. The signed URL may be encrypted with a signing key associated with the first user device. One or more user devices may subsequently attempt to access the resource using the signed URL. For example, the computing device may receive a second request to access the resource from a second user device, and the second request may comprise the signed URL. The computing device may determine a second identifier of the second user device. Based on comparing the second identifier with the first identifier in the signed URL, the computing device may grant or deny access to the resource to the second user device. For example, upon a determination that the second IP address does not match the first IP address in the signed URL, the computing device may deny the second request access to the resource. Conversely, based on a determination that the second IP address matches the first IP address in the signed URL, the computing device may grant the second request access to the resource.

Aspects described herein may also relate to implementing a heightened security mechanism by excluding unauthorized user devices that may share a similar IP range with the authorized user device. For example, a first user device (e.g., an authorized user device) and a second user device (e.g., an unauthorized user device) may correspond to a first IP address and a second IP address. The first and second IP addresses may fall within a same predefined Classless Inter-Domain Routing (CIDR) range. The computing device may determine that the second IP address does not match the first IP address in the signed URL, and deny the second user device access to the resource and the dashboard application that may display the underlying secured data associated with the resource. In the event that the first and second IP addresses might not fall within a same predefined CIDR range, the computing device may deny the second user device access to the resource. The first IP and the second IP addresses may be associated with enterprise users from a same organization. In particular, the first IP address and the second IP address may fall within an IP range whitelist associated with the same organization. The computing device may determine that the second IP address does not match the first IP address in the signed URL, and still deny the second user device access to the resource. As such, sharing of the resource (e.g., the secured data) via a visualization application (e.g., a dashboard application) may be protected from unauthenticated access.

Aspects described herein also relate to implementing a heightened security mechanism using pre-signed and signed URLs. The pre-signed URL may comprise an authentication token indicating that a first user device has been successfully authenticated to access the resource. The pre-signed URL may also comprise an access token indicating that the first user device has a valid privilege to access the resource. After generating the signed URL, the computing device may send, to the first user device, the signed URL. The computing device may receive, from the first user device and after denying the second request access to the resource, a third request to access the resource, and the third request may comprise the signed URL. The computing device may determine a third IP address of the first user device in response to receiving the third request. Based on a determination that the first IP address in the signed URL matches the third IP address, the computing device may grant the first user device access to the resource.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 5 shows illustrative pre-signed and signed URLs.

DETAILED DESCRIPTION

Figure 1:
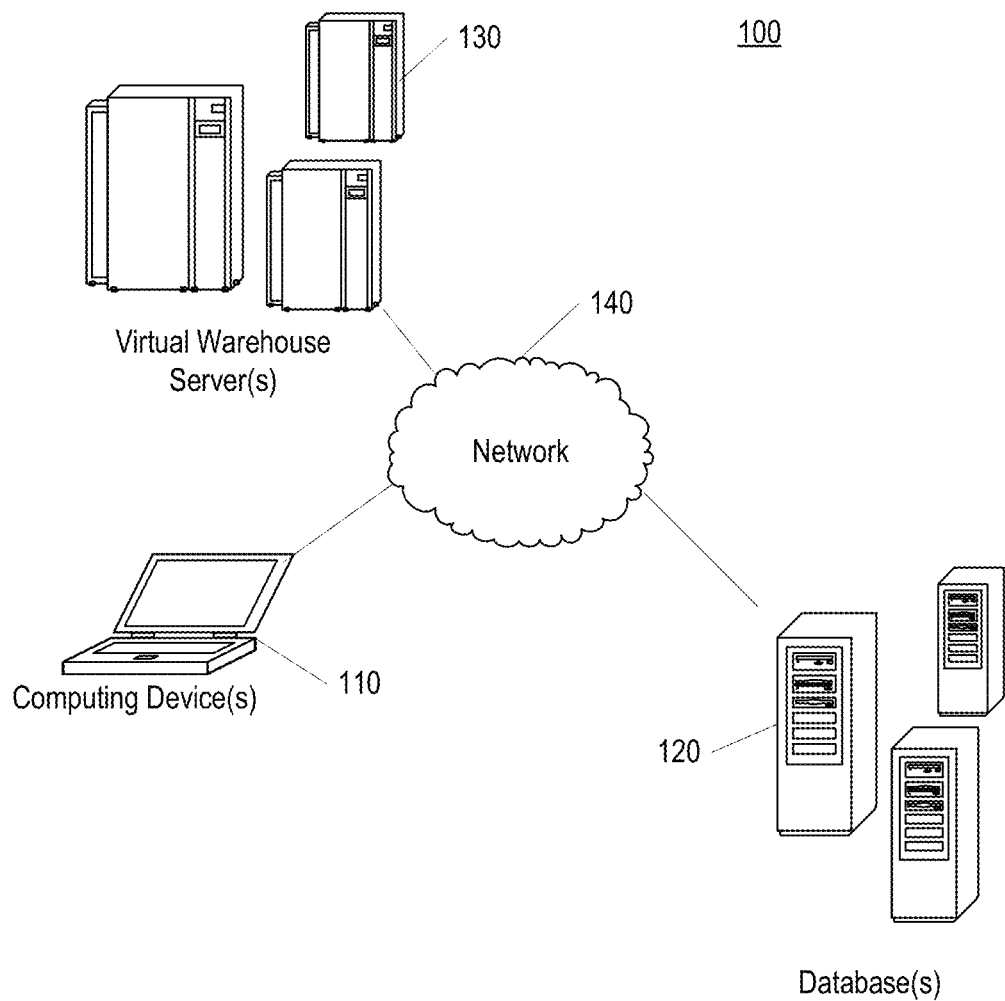
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced.

It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for allowing data producers to share data with consumers in a data sharing marketplace, and in particular a manner in which limits can be placed on consumer access to shared data. This functionality is effectuated via a signed URL containing an identifier of an authenticated user device, which may prevent unauthenticated users from accessing a resource using the signed URL. For example, an unauthenticated user (e.g., a requesting device) may enter the signed URL in a browser and attempt to access the resource bypassing the authentication process. A computing device (e.g., an authentication server) may extract the identifier from the signed URL and compare it with an identifier of the requesting device. The computing device may deny the requesting device access to the resource if the identifiers do not match. The signed URL may contain an access token which further limits consumers to portions of data in compliance with one or more privileges rules. Those privilege rules may be established by the data producer, the consumer, and/or other parties. In this manner, the data stored by the cloud database platform might be freely shared by the data producer without requiring that the data itself be duplicated, modified, and/or otherwise processed to be shared. This process might be referred to as a "zero copy" process, whereby data might be shared near-instantaneously and without requiring that the data be copied or otherwise modified for the consumer's use. The consumers may be allowed to access portions of data to which they are permitted to access while preventing those same consumers from inadvertently gaining access to portions of the data to which they are not permitted to access. This avoids the need to maintain additional cloud storage (and/or file transfer protocol setups), reduces the staff expense to prepare and send data, removes the need to pay for storage or a database to house duplicative data, and generally just results in an easier-to-maintain marketplace for data sharing.

The present disclosure is significantly different than conventional data filtering and organization processes at least because it is fundamentally rooted in a warehouse-as-a-service cloud database platform. Through the use of IP whitelisting of signed URLs, access to portions of data (e.g., a resource) in the warehouse-as-a-service cloud database platform, such as a Snowflake platform, may be limited to a particular authenticated user device. Unauthorized user devices sharing a similar IP range with the authorized user device may be excluded. For example, an authorized user device and an unauthorized device may have a first identifier (e.g., a first IP address) and a second identifier (e.g., a second IP address) respectively. The first and second IP addresses may fall within a same predefined Classless Inter-Domain Routing (CIDR) range. After the authentication, a computing device in an organization may issue a pre-signed URL on behalf of the authenticated device, indicating a location of the resource in the cloud database platform. The computing device may generate a signed URL by prefixing the pre-signed URL with the first identifier. In this manner, when the unauthenticated device attempts to access the resource using the signed URL, the computing device may determine that the second IP address does not match the first IP address in the signed URL, and deny the second user device access to the resource. This is in contrast with a conventional system where any user devices in the same CIDR range may be able to access the resource without proper authentication. For example, an unauthenticated user device may copy a legitimate pre-signed URL issued to the authenticated device in a browser and attempt to use the same pre-signed URL to access the resource. The conventional system may allow the unauthenticated user device to access the resource due to the fact that the unauthenticated user device and the authenticated user device share the same IP range, such as the same CIDR range. For example, the unauthenticated user device and the authenticated user device may be associated with users from a same organization. In particular, their IP addresses may fall within an IP range whitelist associated with the same organization. The present disclosure may distinguish user devices from the same organization or originated from the same IP range, and deny the unauthenticated user devices access to the resource.

The present disclosure may implement a mechanism to control access to data in the cloud database platform using pre-signed and signed URLs. The pre-signed URL may comprise an authentication token indicating that a first user device (e.g., an authenticated user device) has been successfully authenticated to access the resource. The pre-signed URL may also comprise an access token indicating that the first user device has a valid privilege to access the resource. After generating the signed URL, the computing device may send, to the first user device, the signed URL. This signed URL may enable the first user device to subsequently access the resource bypassing the authentication process. For example, the computing device may receive, from the first user device and after denying the second request (e.g., from an unauthenticated user device) access to the resource, a third request to access the resource, and the third request may comprise the signed URL. The computing device may determine a third IP address of the first user device in response to receiving the third request. Based on a determination that a first IP address of the first user device in the signed URL matches the third IP address, the computing device may grant the first user device access to the resource.

The present disclosure improves the functioning of computers by implementing a heightened security mechanism using pre-signed and signed URLs to control access portions of data with respect to one or more data warehouses. The IP whitelisting mechanism of the present disclosure may provide an additional layer of protection against unwanted and/or unauthenticated users for the visualization of the secured data via a dashboard application. Conventional approaches can be less secure, particularly when data is shared between different consumers in a same organization. For example, for a data creator to share data with a consumer, that creator might send the data over to the consumer. Illegitimate consumers residing on, for example, a same CIDR range as the legitimate consumer may be able to bypass the authentication process. This can incur security issues, and introduce a large number of other concerns (e.g., privacy, control, etc.). In contrast, the present disclosure avoids these issues by excluding unauthenticated user devices in the same organization from accessing the dashboard application displaying the data, while providing limited access to the portions of the data that a legitimate consumer has proper privileges to access that data via the dashboard application.

The present disclosure is also fundamentally rooted in computing devices and, in particular, an environment with virtual warehouses. Presently, Snowflake's architecture is unique in that it allows for the cloud storage of data, with consumers of that data able to access the data through virtual warehouses. In contrast, other database systems rely on monolithic systems to handle all enterprise needs. It is precisely this architecture of Snowflake (and similar virtual warehouse systems) that is leveraged by the improvements discussed herein.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 may be located in a first location (e.g., the offices of a corporation), and the virtual warehouse servers 130 and/or the data warehouses 120 may be located in a variety of locations (e.g., distributed in a redundant manner across the globe). This may protect business resources: for example, if the Internet goes down in a first location, the distribution and redundancy of various devices may allow a business to continue operating despite the outage.

The virtual warehouse servers 130 may be all or portions of a virtual warehouse as a service system, such as is provided via the Snowflake architecture. For example, the computing devices 110 and/or the data warehouses 120 may be managed by an organization. In contrast, the virtual warehouse servers 130 may be managed by a different entity, such as Snowflake Inc. In this manner, a third party (e.g., Snowflake) may provide, as a service, virtual warehouses which may operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse may be a single database, a collection of databases, or the like. A data warehouse may be structured and/or unstructured, such that, for example, a data warehouse may comprise a data lake. A data warehouse may store data in a variety of formats and in a variety of manners. For example, a data warehouse may comprise textual data in a table, image data as stored in various file system folders, and the like.

The data transferred to and from various computing devices in a system 100 may include secure and sensitive data, such as confidential documents, consumer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
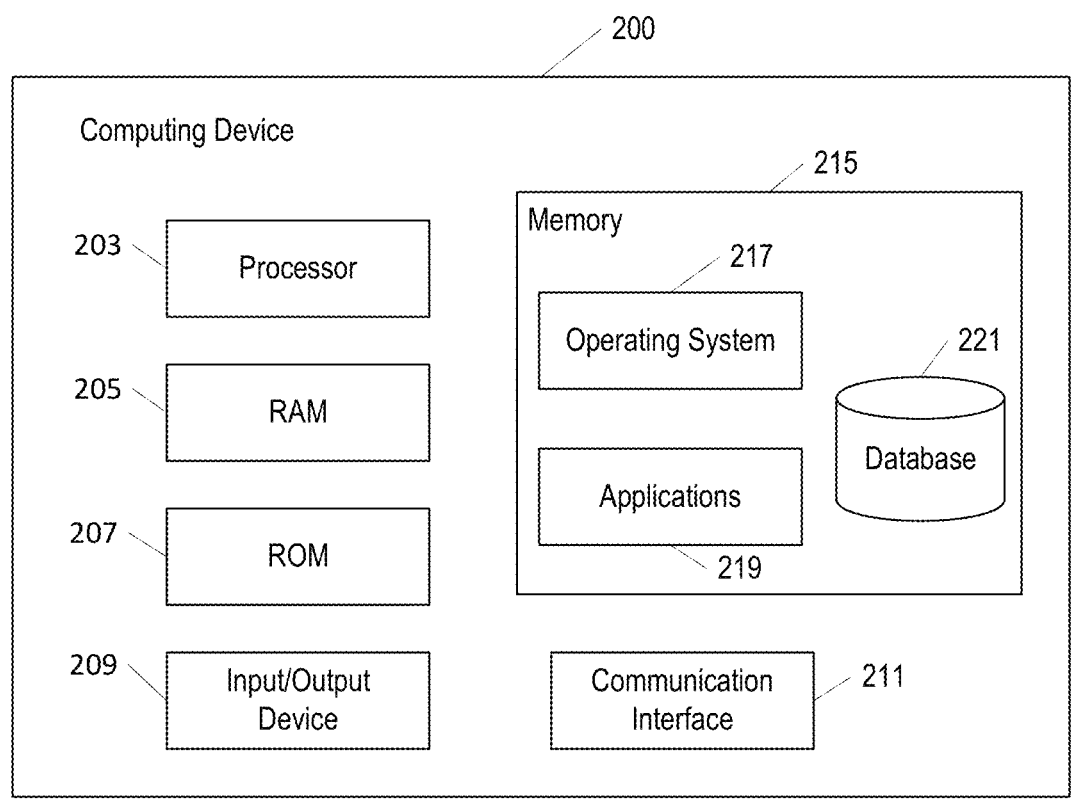
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
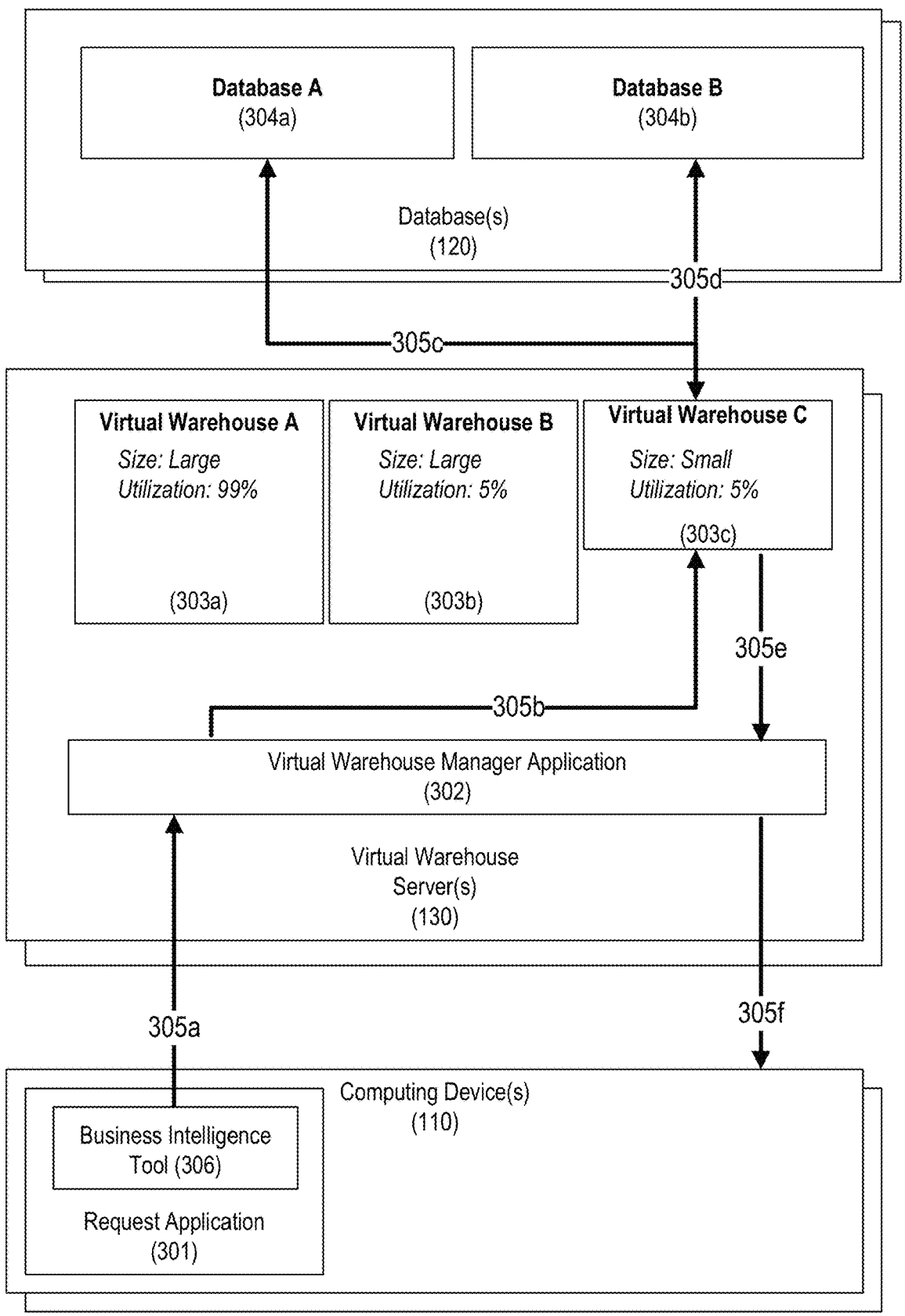
FIG. 3 depicts computing devices, virtual warehouse servers, and data warehouses working in conjunction to execute queries.

FIG. 3 shows a system comprising a data sharing platform (which comprises, e.g., the computing devices 110 of FIG. 1) and a cloud database platform (which comprises, e.g., the virtual warehouse servers 130 and the data warehouses 120 of FIG. 1). FIG. 3 may depict all or portions of a system configured according to the Snowflake architecture or a similar architecture, which provides access to cloud databases (in a database-as-a-service format) via which users may share via a data marketplace and/or may submit queries using one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by Snowflake Inc., of San Mateo, CA.

The data sharing platform 307 and cloud database platform 306 are shown as separate in FIG. 3. In some instances, the data sharing platform 307 and the cloud database platform 306 (and/or any portions thereof) may be managed by the same or different entities. For example, the cloud database platform 306 may correspond to preexisting Snowflake architecture managed by Snowflake Inc. of San Mateo, CA, whereas the data sharing platform 307 may be managed by another organization. In practice, some of the computing devices, networks, and other aspects of the data sharing platform 307 and/or the cloud database platform 306 may overlap. For instance, some of the devices managed by one entity might be located in offices managed by Snowflake, and/or the devices in the data sharing platform 307 may be communicatively coupled to devices in the cloud database platform 306 via a private network.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month").

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, or the like. The requesting application 301 may include a business intelligence (BI) tool 306 that may interact with virtual warehouse manager application 302, capture quantitative and qualitative data from the underlying warehouses, and share a visualization that may display the underlying data source from, for example, Snowflake. The BI tool 306 may be a dashboard application, such as Quicksight produced by Amazon Inc. of Seattle, Washington. The underlying data source may include secure data that the BI tool 306 may expose in a visual manner to the user. The IP whitelisting mechanism may provide an additional layer of protection against unwanted and/or unauthenticated users from viewing or accessing the secure data. The data scientist may review and analyze the data to enable smarter decision-making. For example, the BI tool 306 may implement a dashboard application to showcase the captured data without directly exposing the dashboard application. The dashboard application may be created and embedded in the requesting application 301. The data scientists may apply data filters to interact with and visualize the captured data in the dashboard. As such, the data scientist may discover hidden insights from the captured data, perform more accurate forecasting and conduct what-if analysis.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303b and the virtual warehouse C 303c, at least because both have a low utilization rate and thus may be capable of handling the request received from the request application 301. From that subset, one or more virtual warehouses may be selected to execute the query. For example, as shown in the example provided in FIG. 3, the virtual warehouse C 303c has been selected to address the query. This may be because, for example, the query may be small (that is, the execution plan may be simple or otherwise quick to handle), such that executing the query on the virtual warehouse C 303c may be cheaper and may free up the virtual warehouse B 303b for handling larger, more complex queries.

Virtual warehouses, such as the virtual warehouse A 303a, the virtual warehouse B 303b, and/or the virtual warehouse C 303c, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Broadly, such quantities of computing resources may be referred to via "t-shirt sizes," such that one virtual warehouses may be referred to as "large," whereas another may be referred to as "small." Virtual warehouses may be resized such that, for example, the virtual warehouse A 303a (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to enable execution of queries, collect results, and provide those results.

Virtual warehouses may use one or more view definitions to retrieve content from the databases 120. For example, a virtual warehouse might use a view definition to specify which portion(s) of data stored in the databases 120 should be displayed to a user. Such view definitions might be established such that, for example, a consumer of data might not have access to all data stored by a database, but rather might be limited to a portion of that data.

Though the virtual warehouse manager application 302 is shown as part of the virtual warehouse servers 130, the virtual warehouse manager application 302 may execute on a wide variety of computing devices. For example, the virtual warehouse manager application may execute on one or more of the computing devices 110, such as the same computing device 110 hosting the request application 301. As another example, the virtual warehouse manager application may execute on an entirely separate computing device. Because the virtual warehouse manager application 302 may perform steps above and beyond conventional virtual warehouse functionality, the application may execute on an entirely separate computing device and may interface with preexisting virtual warehouse systems, e.g., Snowflake.

As part of step 305c and 305d, the selected virtual warehouse (in this case, the virtual warehouse C 303c) may execute the query requested by the request application 301. As shown in FIG. 3, this entails querying both the data warehouse A 304a and the data warehouse B 304b. The data warehouses 120, such as the data warehouse A 304a and the data warehouse B 304b, need not be the same: for example, the data warehouse A 304a may have an entirely different format, may have entirely different schedules which affect their size at any given time, and may have an entirely different structure as compared to the data warehouse B 304b. For instance, the data warehouse A 304a may comprise a SQL database, whereas the data warehouse B 304b may comprise a file server which stores files according to the File Allocation Table (FAT) file system. As part of this process, the virtual warehouse C 303c may receive, store, and/or organize results from the data warehouses 120. For example, the virtual warehouse C 303c may receive query results from the data warehouse A 304a and the data warehouse B 304b, may store those results in memory, and then may encrypt those results for security purposes.

As part of step 305e, the virtual warehouse C 303c provides the collected results to the virtual warehouse manager application 302. Then, as part of step 305f, the virtual warehouse manager application 302 provides the results to one or more of the computing devices 110. This process is optional, as the virtual warehouse C 303c may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

The steps depicted in FIG. 3 are illustrative, and represent simplified examples of processes which may be performed by the elements depicted in FIG. 3. For example, while step 305a is reflected as an arrow directly leading from the request application 301 to one or more of the virtual warehouse servers 130, the request may in fact be routed through various other computing devices as part of the network 140. As another example, the query process reflected in step 305c and step 305d may involve a plurality of different transmissions between the virtual warehouse C 303c and the data warehouses 120.

Figure 4:
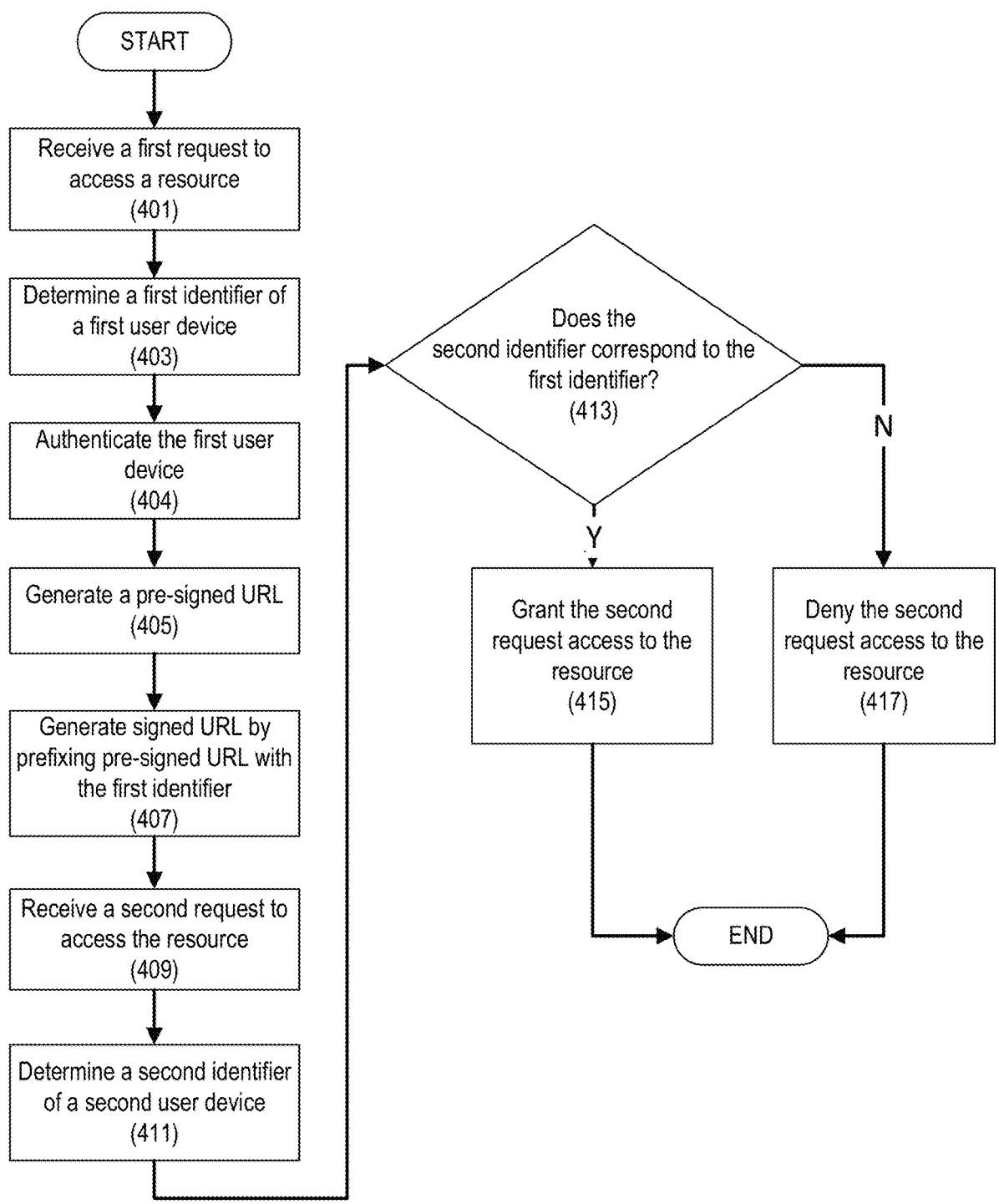
FIG. 4 shows a flow chart which may be performed to implement IP whitelisting for signed URLs.

As a preliminary introduction to FIG. 4, in the circumstance where a data producer has shared data with a consumer via a data marketplace, one or more signed URLs may be used to provide limited access to an authenticated user device. A signed URL may include a prefix of an identifier of the authenticated device, so that only the authenticated user device may use the signed URL to access data in the cloud database platform. The signed URL may contain an access token so that the authenticated user device may only access a portion of data in the cloud database as stipulated by one or more privileges associated with the access token.

FIG. 4 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 4. The steps depicted in FIG. 4 may operate on a Snowflake environment or other virtual warehouse environment, such that they may be performed by a computing device within or external to such an environment. For example, the steps depicted in FIG. 4 may be performed on a user device external to the cloud database platform.

At step 401, the computing device may receive, from a first user device, a first request to access a resource. For example, the first user device may be similar to the computing devices 110 and may send a first request to access data stored in the cloud database platform via a dashboard application that may display the data. The first user device may request access to all records stored by the database. For example, an owner of data may use the first user device to access her own data. In this manner, records of the data might not be excluded when presented to the owner. The first request may be additionally and/or alternatively configured to enable execution of queries against the database using processing resources of one or more virtual warehouses provided by the cloud database platform. For example, a consumer of the data may use the virtual warehouse 303a to query one or more of the databases 120. The data stored in the database may include sensitive data such as financial or personal information. The consumer may request access to the sensitive data to facilitate tasks such as credit decisioning or fraud detection logics. The consumer may have privileges to view a subset of the sensitive data based on her role in an enterprise. For example, the consumer may be a manager in the corporate finance department. In response to her request to access the financial data and the underlying queries to the database, the computing device may compile information providing a view or a snapshot on enterprise costs data comprising information related to, for example, used or purchased credits, contract start and end dates and projected credit consumed dates.

At step 403, in response to receiving the first request from the first user device, the computing device may determine a first identifier of the first user device based on the first request. For example, the first identifier may include an IP address, a phone number, an account number, and/or a unique name that may identify the first user device. An Internet Protocol (IP) address may be assigned by an internet service provider (ISP) or a network administrator. The IP address may be with a TCP/IP protocol and may identify a device connected to a network. Additionally or alternatively, the first identifier may include a hardware identifier such as a Media Access Control (MAC) address, or a CPU identifier. A MAC address may be assigned by a manufacturer of the device and uniquely identify the device on a network. The MAC address may be found on the device's network interface controller (NIC) card and may be referred to as a burned-in address, an Ethernet hardware address or a physical address. In some examples, the identifier may uniquely identify the first user device, rather than a user of the device, such that the computing device may detect the situation when the same user may attempt to login from a different user device and may ask the user to re-authenticate for heightened security implementations.

At step 404, the computing device may authenticate the first user device. For instance, as part of the authentication process, the first user device may prompt the user to input credentials. For example, the first user device may prompt the user to provide authentication information verifying that the user is permitted to access the resource. In some instances, in prompting for the credentials, the first user device may prompt for a username, password, authentication key, and/or other authentication information (which may, in some instances, include multifactor authentication). These credentials may be used by the computing device to authenticate the first user device. In some examples, the first user device may send the first request to access the resource, along with the credentials received from the user, to the computing device. The first user device may send security information indicating device integrity corresponding to the first user device. For example, the first user device may generate a numeric identifier and/or other indication of an integrity level of the first user device, and may send this information to the computing device.

The computing device may receive the first request to access the resource, credentials, and/or security information from the first user device. The computing device may attempt to validate the received credentials. If the computing device validates the received credentials, the computing device may proceed to generate the pre-signed URL on behalf of the first user device. If the computing device determines that the received credentials are invalid, the computing device may send a notification to the first user device, indicating that the received credentials were not authenticated and requesting updated credentials.

At step 405, the computing device may generate a pre-signed Uniform Resource Locator (URL) indicating a location of the resource. The pre-signed URL may be generated based on authentication of the first user device. The pre-signed URL may include an indication that the first user device is permitted to access the resource. The pre-signed URL may be a URL providing to the users to grant a temporary access to a specific object (e.g., the resource) in the database. The object may represent a data structure used to store or reference data. The object may include, for example, tables, indexes, stored procedures, views, queries, forms or reports. The user may use the pre-signed URL to either read the object or write an object (e.g., to update an existing object or create a new object).

The pre-signed URL may contain specific parameters which may be set by the computing device. For example, the pre-signed URL may contain an authentication token indicating that the first user device has been successfully authenticated to access the resource. Additionally and/or alternatively, the parameters may include a key indicating the name of the object or the resource. Additionally and/or alternatively, the parameters may include an expiry time. The pre-signed URL may provide a path to access the resource for a specific amount of time based on the temporary credentials generated on behalf of the user. For example, the pre-signed URL may have an expiry time of 30 minutes, and the user may follow the path in the pre-signed URL to access the resource before the expiry time. For example, the user may enter the pre-signed URL in a browser to access the resource. Once the expiry time has lapsed, the user would be unable to interact with the object.

An enterprise may use IP addresses in the form of CIDR ranges that may rotate among enterprise users periodically (e.g., daily or weekly). A CIDR range may represent a range of IP addresses a network might use within the enterprise. A CIDR address may be similar to a regular IP address, but ends with a slash followed by a number. The number after the slash may represent the number of addresses in the range. The pre-signed URL may be tied to the CIDR range for user devices within the organization. The CIDR range may include start and end IP addresses. These IP addresses may correspond to customers, for example, whose instances are hosted within a specific entity and/or region, such as inside the United States, inside a particular organization, or the like. As a result, conventional systems may issue the pre-signed URL to an authorized device (e.g., the first user device), but any user devices within the CIDR range may use the pre-signed URL to interact with the object during creation. The CIDR range may be associated with a whitelist (e.g., a pass list or allow list) that may implement a mechanism which might explicitly allow some identified IP addresses within the enterprise to access the particular resource via a dashboard application that may display secured data associated with the particular resource. Any user devices with IP addresses not falling within the CIDR range may be denied by default and might not be able to view the secured data via the dashboard application.

The pre-signed URL may include an access key or a signature as query parameters to the protected resource in the database. Additionally or alternatively, the pre-signed URL may contain other parameters such as an algorithm used to encrypt data in the pre-signed URL, the credentials provided by the first user device, the date and the signature.

FIG. 5 shows an illustrative pre-signed URL. After a user device is authenticated successfully, the computing device may generate the pre-signed URL 510 indicating a path to the resource. For example, a consumer may have a role as a manager in the corporate finance department. She may have privileges to view sensitive financial data based on her role in an enterprise. In response to her request to access the financial data, the computing device may execute queries to retrieve the relevant data from the database. The computing device may compile the financial data and provide a view or a snapshot on a dashboard that displays information on enterprise costs, which may include used or purchased credits, contract start and end dates, and projected credit consumed dates. As shown in FIG. 5, the pre-signed URL 510 may contain parameters such as a key "presignedurlde-mo.us-east-1.quicksight.ws.com/dashboards" indicating the name of the resource (e.g., the enterprise costs data) to be retrieved in response to the user request. The parameters may include an expiry time "1800," indicating the pre-signed URL 510 may have an expiry time of 30 minutes, and the user may follow the path in the pre-signed URL to access the resource before this expiry time. The pre-signed URL 510 may contain other parameters such as "HMAC-SHA256" as the encryption algorithm used to encrypt data in the pre-signed URL 510, the encrypted credential "AKIAJJWZ7B6WCRGMKFGQ%2F20180210" provided by the user device, the date and the signature "12b74b0788aa036bc7c3d03b3f20c61f1f91cc9ad8873e331 4255dc479a25351" etc. In the example of FIG. 5, the pre-signed URL 510 may be tied to a CIDR range 515 "192.168.0.15/24." The authenticated user device may have the IP address, for example, "192.168.0.20." Although the enterprise may intend to grant the authenticated user device "192.168.0.20" access, any user devices in the CIDR range "192.168.0.15/24" may use the pre-signed URL 510 to access the dashboard application.

At step 407, the computing device may generate a signed URL by prefixing the pre-signed URL with the first identifier of the first user device. The signed URL comprising the pre-fixed first identifier may be encrypted with a signing key associated with the first user device. Using the signed URL may address the security loophole associated with the pre-signed URL discussed in step 405. For example, the pre-signed URL may be pre-fixed with a first IP address of the specific user device (e.g., the first user device) to which the pre-signed URL was originally issued. As such, only the IP address holder may be allowed to access the resource via the signed URL. Given that the pre-signed URL may be tied to the CIDR range, it might not be used directly to validate the first user device's authenticity. In some examples, the computing device may use a wrapper script to generate the signed URL. For example, the computing device may retrieve and store the first IP address of the first user device at runtime as an object. The computing device may generate the signed URL by pre-fixing the first IP address to the pre-signed URL. Similar to the pre-signed URL, the signed URL may contain authentication information in its query string, allowing users without credentials to perform specific actions on the resource. The first identifier in the signed URL may be encrypted with an encryption key of the first user device. Additionally and/or alternatively, the first identifier may be obfuscated and/or otherwise hashed such that a user cannot manually prefix the pre-signed URL with a desired identifier.

The computing device may generate a signed URL by appending the first identifier of the first user device to the pre-signed URL. For example, a first IP address of the authenticated first user device may be appended to the pre-signed URL to generate the signed URL. The appended first IP address in the signed URL may be encrypted with the encryption key of the first user device. Additionally or alternatively, the computing device may generate a signed URL by inserting the first identifier of the first user device to the pre-signed URL. For example, the first IP address of the authenticated first user device may be inserted to a predetermined location in the pre-signed URL to generate the signed URL. Likewise, the inserted first IP address in the signed URL may be encrypted with the encryption key of the first user device.

FIG. 5 also shows an illustrative signed URL 520. In the example illustrated in FIG. 5, signed URL 520 may be generated based on pre-signed URL 510. For example, the first IP address of the authenticated user device "192.168.0.20" may be pre-fixed to the pre-signed URL 510. The first IP address may be encrypted with the encryption key of the authenticated user device. The resulting signed URL 520 may contain a new parameter "e5a1e64ed7ac41cb8e5e315878e504eb" indicating the encrypted format of the first IP address. As such, the signed URL 520 may be tied to the IP address 192.168.0.20, but not other user devices in the CIDR range.

At step 409, the computing device may receive a second request to access the resource from a second user device and the second request may carry the signed URL. The second user device may be the same as the first user device which was authenticated previously. The second user device may be a device different from the first user device.

For example, the second device may copy the signed URL and enter it in a browser attempting to access the dashboard application. Additionally or alternatively, the second user device may be a user device within the same enterprise as the first user device or the second user device may be located in the same CIDR range as the first user device.

At step 411, the computing device may determine a second identifier of the second user device. For example, similar to step 403, the computing device may determine an IP address of the second user device.

At step 413, the computing device may determine whether the second identifier corresponds to the first identifier by comparing the second identifier with the first identifier in the signed URL. For example, the computing device may extract the encrypted first IP address from the designated location in the signed URL, such as from a beginning portion, an end portion or a designated location in the middle portion of the signed URL. The computing device may decrypt the extracted first IP address with the decryption key to obtain the first IP address in the clear form. If the second identifier corresponds to the first identifier, the method depicted in FIG. 4 proceeds to step 415. Otherwise, the method depicted in FIG. 4 proceeds to step 417.

At step 415, based on a determination that the second identifier corresponds to the first identifier, the computing device may determine that the first and second user devices are the same. The computing device may grant the second request access to the resource. Once authenticated, the signed URL may allow subsequent access from the same user device bypassing the authentication process, as long as the signed URL is within the expiry time. For example, after generating the signed URL, the computing device may send the signed URL to the first user device and the first user device may store the signed URL for subsequent accesses. The computing device may receive a third request to access the resource from the first user device, and the third request may comprise the signed URL. The computing device may determine a third identifier of the first user device in response to receiving the third request. Based on a determination that the first identifier in the signed URL matches the third identifier, the computing device may grant the first user device access to the resource.

At step 417, based on a determination that the second identifier does not match the first identifier, the computing device may deny the second request access to the resource. For example, this may correspond to the situation that another user device residing in the same enterprise or same CIDR range as the first user may attempt to access the resource via the dashboard application. Similar to the CIDR range, an enterprise may implement an IP range whitelist. The conventional system may allow any user devices on the IP range whitelist to access the resource. The disclosure here addresses this security issue by excluding unauthenticated user devices on the IP range whitelist to access and/or view secured data via the dashboard application. Additionally and/or alternatively, an imposter outside the enterprise may obtain the signed URL and attempt to access and/or view the resource including the secured data via the dashboard application from an external network. The computing device may enforce a heightened security mechanism and exclude such user devices from accessing the dashboard application.

Figure 6A:
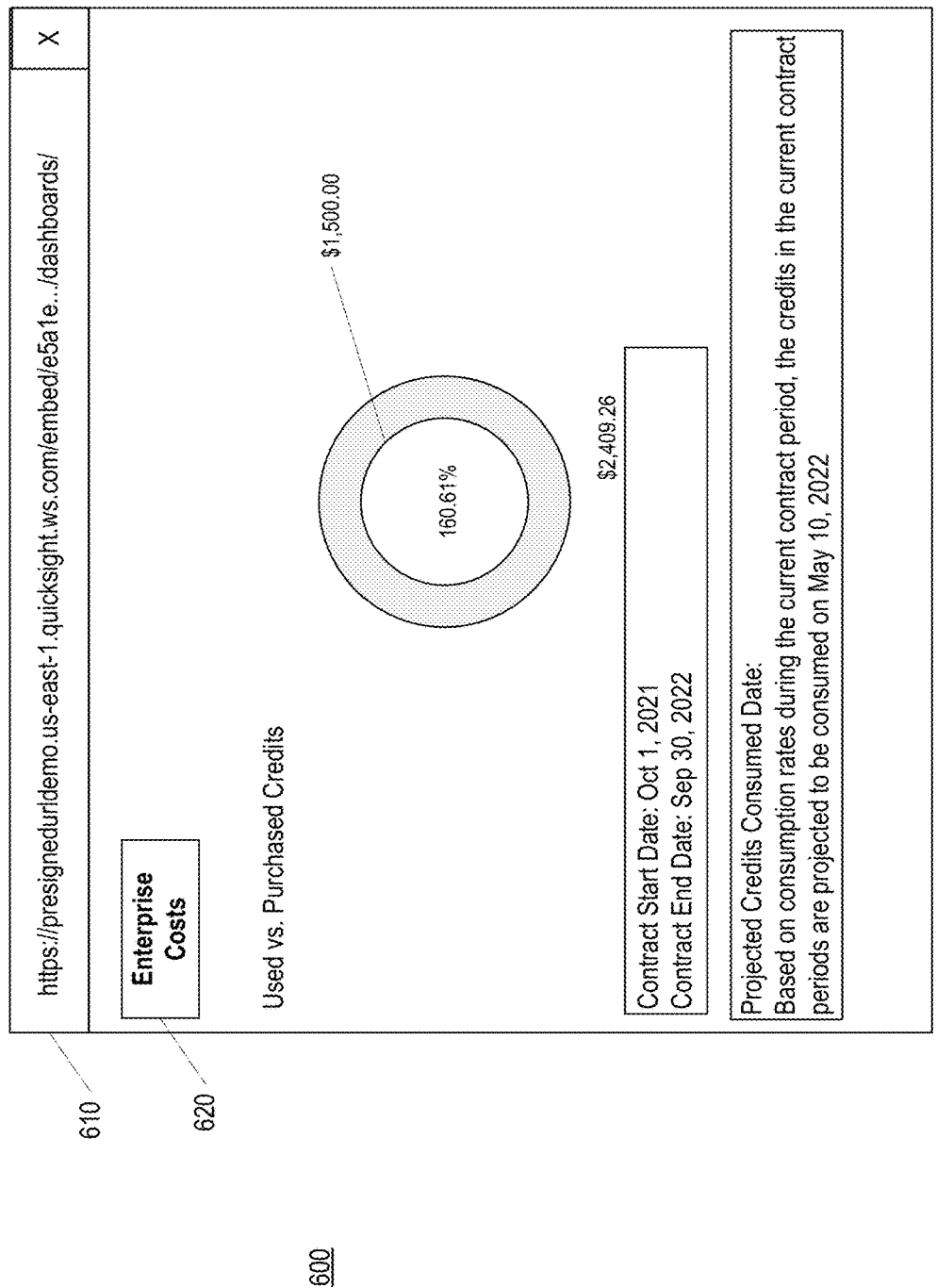
FIGS. 6A-6B show user interfaces for accessing data in virtual warehouses via a dashboard application using a signed URL.
Figure 6B:
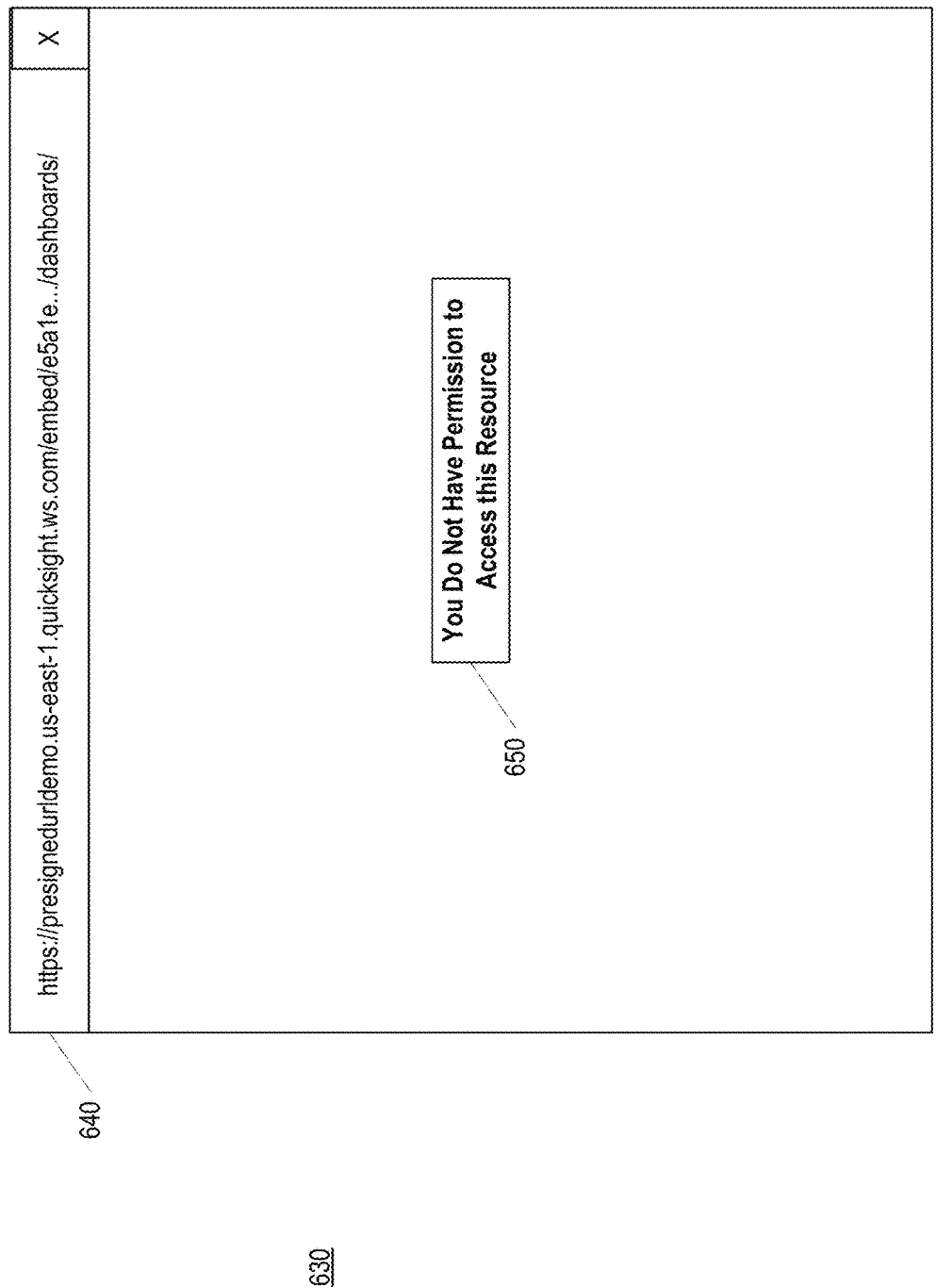

FIGS. 6A-6B show user interfaces for accessing data in virtual warehouses via a dashboard application using a signed URL. As illustrated in FIG. 6A, a legitimate user may enter a signed URL, for example, the signed URL 520 in FIG. 5, to a browser window 610 to access a dashboard application that displays enterprise costs data in the virtual warehouses. An enterprise computing device may extract a first IP address from the signed URL and retrieve a second IP address of a user device that hosts the user interface 600.

The computing device may determine that the first and second IP addresses match with each other and display requested financial data on the interface 600. The consumer may have privileges to view the financial data related to enterprise costs 620, based on her role as a manager in the corporate finance department. In response to her request to access the financial data, the computing device may execute queries against the virtual data warehouse. The computing device may provide a view or a snapshot on the enterprise costs information via the dashboard application. For example, the interface 600 displays used or purchases credits, a contract start and end dates and projected credit consumed date. The displayed enterprise costs information may facilitate the user to perform tasks such as credit decisioning.

As illustrated in FIG. 6B, an illegitimate user may attempt to access the dashboard application using a signed URL. For example, the illegitimate user may obtain the signed URL 520 in FIG. 5 from an authenticated user and enter the signed URL 520 to a browser window 640 to access the dashboard application that is capable of displaying enterprise costs data in the virtual warehouses. An enterprise computing device may extract a first IP address from the signed URL and retrieve a second IP address of a user device used by the illegitimate user that hosts the user interface 630. The computing device may determine that the first and second IP addresses do not match with each other and deny access to the dashboard application. The computing device may determine that the illegitimate user has not been authenticated properly to view the secured data via the dashboard application. Accordingly, the computing device may display a message 650 "you do not have permission to access this resource" on the interface 630.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
one or more processors; and
memory storing instructions that, when executed by the one or more processors, cause the computing device to:
receive, from a first user device, a first request to access a resource;
determine, based on the first request and in response to receiving the first request from the first user device, a first identifier that uniquely identifies the first user device;
upon authenticating the first user device, generate a pre-signed Uniform Resource Locator (URL) indicating a location of the resource, wherein the pre-signed URL comprises an indication that is only usable by the first user device to access the resource;
generate a signed URL by prefixing the pre-signed URL with the first identifier of the first user device, wherein the signed URL is encrypted with a signing key associated with the first user device;
receive a second request to access the resource, wherein the second request comprises the signed URL;
determine a second identifier corresponding to the second request, wherein the second identifier uniquely identifies a second user device, and the first user device and the second user device are associated with a same organization, and wherein the first identifier and the second identifier comprise Internet Protocol (IP) addresses falling within an IP range whitelist associated with the same organization; and
based on comparing the second identifier with the first identifier in the signed URL, deny the second request access to the resource.

2. The computing device of claim 1, wherein the instructions, when executed by the one or more processors, cause the computing device to deny the second request access to the resource by causing the computing device to:
based on a determination that the second identifier does not match the first identifier in the signed URL, deny the second request access to the resource.

3. The computing device of claim 1, wherein the instructions, when executed by the one or more processors, cause the computing device to deny the second request access to the resource by causing the computing device to:
extract, from the signed URL, the first identifier; and
compare the extracted second identifier with the first identifier.

4. The computing device of claim 1, wherein the first identifier and the second identifier comprise the IP addresses falling within a same predefined Classless Inter-Domain Routing (CIDR) range.

5. The computing device of claim 1, wherein the first user device and the second user device are associated with same user, wherein the instructions, when executed by the one or more processors, cause the computing device to deny the second request access to the resource by causing the computing device to:

based on a determination that the second identifier does not match the first identifier in the signed URL, deny the second request access to the resource.

6. The computing device of claim 1, wherein the resource resides in one or more data warehouses that are provided as a service in a cloud computing environment.

7. The computing device of claim 1, wherein the pre-signed URL comprises an authentication token indicating that the first user device has been successfully authenticated to access the resource.

8. The computing device of claim 1, wherein the pre-signed URL comprises an access token indicating that the first user device has a valid privilege to access the resource.

9. The computing device of claim 1, wherein the instructions, when executed by the one or more processors, cause the computing device to:
after generating the signed URL, send, to the first user device, the signed URL;
receive, from the first user device and after denying the second request access to the resource, a third request to access the resource, wherein the third request comprises the signed URL;
determine a third identifier of the first user device in response to receiving the third request from the first user device; and
based on a determination that the first identifier in the signed URL matches the third identifier, grant the first user device access to the resource.

10. The computing device of claim 1, wherein the instructions, when executed by the one or more processors, cause the computing device to deny the second request access to the resource by causing the computing device to:
determine whether the second identifier falls within a predefined Classless Inter-Domain Routing (CIDR) range; and
deny the second request access to the resource after determining that the second identifier does not fall within the predefined CIDR range.

11. A method comprising:
receiving, from a first user device, a first request to access a resource;
determining, based on the first request in response to receiving the first request from the first user device, a first identifier that uniquely identifies the first user device;
upon authenticating the first user device, generating a pre-signed Uniform Resource Locator (URL) indicating a location of the resource, wherein the pre-signed URL comprises an indication that is only usable by the first user device to access the resource;
generating a signed URL by prefixing the pre-signed URL with the first identifier of the first user device, wherein the signed URL is encrypted with a signing key associated with the first user device;
receiving a second request to access the resource, wherein the second request comprises the signed URL;
determining a second identifier corresponding to the second request, wherein the second identifier uniquely identifies a second user device, and the first user device and the second user device are associated with a same organization, and wherein the first identifier and the second identifier comprise Internet Protocol (IP) addresses falling within an IP range whitelist associated with the same organization; and
based on comparing the second identifier with the first identifier in the signed URL, denying the second request access to the resource.

12. The method of claim 11, wherein denying the second request access to the resource comprises:
based on a determination that the second identifier does not match the first identifier in the signed URL, denying the second request access to the resource.

13. The method of claim 11, wherein denying the second request access to the resource comprises:
based on a determination that the second identifier matches the first identifier in the signed URL, granting the second request access to the resource.

14. The method of claim 11, wherein the first identifier and the second identifier comprise the IP addresses falling within a same predefined Classless Inter-Domain Routing (CIDR) range.

15. The method of claim 11, wherein the first user device and the second user device are associated with a same user.

16. The method of claim 15, wherein the resource resides in one or more data warehouses that are provided as a service in a cloud computing environment.

17. The method of claim 12, further comprising:
after generating the signed URL, sending, to the first user device, the signed URL;
receiving, from the first user device and after denying the second request access to the resource, a third request to access the resource, wherein the third request comprises the signed URL;
determine a third identifier of the first user device in response to receiving the third request from the first user device; and
based on a determination that the first identifier in the signed URL matches the third identifier, grant the first user device access to the resource.

18. One or more non-transitory computer-readable media storing instructions that, when executed by one or more processors, cause a computing device to:
receive, from a first user device, a first request to access a resource;
determine, based on the first request and in response to receiving the first request from the first user device, a first identifier that uniquely identifies the first user device;
upon authenticating the first user device, generate a pre-signed Uniform Resource Locator (URL) indicating a location of the resource, wherein the pre-signed URL comprises an indication that is only usable by the first user device to access the resource;
generate a signed URL by prefixing the pre-signed URL with the first identifier of the first user device, wherein the signed URL is encrypted with a signing key associated with the first user device;
receive a second request to access the resource, wherein the second request comprises the signed URL;
determine a second identifier corresponding to the second request, wherein the second identifier uniquely identifies a second user device, and the first user device and the second user device are associated with a same organization, and wherein the first identifier and the second identifier comprise Internet Protocol (IP) addresses falling within an IP range whitelist associated with the same organization; and
based on comparing the second identifier with the first identifier in the signed URL, deny the second request access to the resource.

19. The computer-readable media of claim 18, wherein the instructions, when executed by the one or more processors, cause the computing device to deny the second request access to the resource by causing the computing device to:

based on a determination that the second identifier does not match the first identifier in the signed URL, deny the second request access to the resource.

20. The computer-readable media of claim 18, wherein the first identifier and the second identifier comprise the IP addresses falling within a same predefined Classless Inter-Domain Routing (CIDR) range.

* * * * *